(12) United States Patent
Willett et al.

(10) Patent No.: US 6,632,862 B2
(45) Date of Patent: *Oct. 14, 2003

(54) BIODEGRADABLE POLYMER COMPOSITIONS, METHODS FOR MAKING SAME, AND ARTICLES THEREFROM

(75) Inventors: Julius L. Willett, Morton, IL (US); William M. Doane, Morton, IL (US); Sterling St. Lawrence, Peoria, IL (US); Parvinder Walia, Midland, MI (US)

(73) Assignees: The United States of America as represented by the Secretary of Agriculture, Washington, DC (US); Biotechnology Research and Development Corporation, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,383

(22) Filed: May 18, 2001

(65) Prior Publication Data

US 2003/0036588 A1 Feb. 20, 2003

Related U.S. Application Data

(63) Continuation-in-part of application No. 09/784,701, filed on Feb. 15, 2001, now Pat. No. 6,362,256, which is a continuation of application No. 09/289,702, filed on Apr. 12, 1999, now Pat. No. 6,191,196.

(51) Int. Cl.$^7$ .............................. C08L 1/00; C08L 1/02; C08L 1/08; C08L 3/00; C08L 5/00
(52) U.S. Cl. ........................... 524/13; 524/14; 524/15; 524/16; 524/27; 524/35; 524/37; 524/38; 524/47; 524/48; 524/50; 524/51; 524/54; 524/55
(58) Field of Search .............................. 524/13, 14, 15, 524/16, 27, 35, 37, 38, 47, 48, 50, 51, 54, 55

(56) References Cited

U.S. PATENT DOCUMENTS

| | | |
|---|---|---|
| 5,171,820 A | 12/1992 | Mang et al. |
| 5,384,187 A | 1/1995 | Uemura et al. |
| 5,391,423 A | 2/1995 | Wnuk et al. |
| 5,412,005 A | 5/1995 | Bastioli et al. |
| 5,496,910 A | 3/1996 | Mang et al. |
| 5,665,786 A | 9/1997 | Xu et al. |
| 5,703,160 A | 12/1997 | Dehennau et al. |
| 5,783,271 A | 7/1998 | Nishida et al. |
| 5,821,286 A | 10/1998 | Xu et al. |
| 5,852,078 A | 12/1998 | Willett et al. |
| 5,874,486 A | 2/1999 | Bastioli et al. |
| 6,191,196 B1 * | 2/2001 | Willett et al. .................. 524/13 |
| 6,362,256 B2 * | 3/2002 | Willett et al. .................. 524/13 |
| 6,407,225 B1 | 6/2002 | Mang et al. ............. 536/123.1 |

FOREIGN PATENT DOCUMENTS

| | | |
|---|---|---|
| EP | 0 741 178 A2 | 3/1995 |
| EP | 0 667 369 A1 | 8/1995 |
| WO | WO 97/23564 | 7/1997 |

OTHER PUBLICATIONS

"Filling of Poly(Lactic Acid) With Native Starch", S. Jacobsen and H. G. Fritz, Polymer Engineering & Science, Society of Plastics Engineers, vol. 36, No. 22, pp. 2799–2804, Nov. 1, 1996.

"Physical Properties of Poly(Lactic Acid) and Starch Composites With Various Blending Ratios", T. Ke and X. Sun, Cereal Chemistry, American Association of Cereal Chemists, vol. 77, No. 6, pp. 761–768, Nov. 6, 2000.

* cited by examiner

Primary Examiner—Nathan M. Nutter
(74) Attorney, Agent, or Firm—Bliss McGlynn, P.C.

(57) ABSTRACT

A polymer composition includes a first component being a hydroxy-functional polymer, a second component being a natural polymer and a third component being a thermoplastic polyester. The first component, second component and third component are compounded to form a polymer composition.

30 Claims, 7 Drawing Sheets

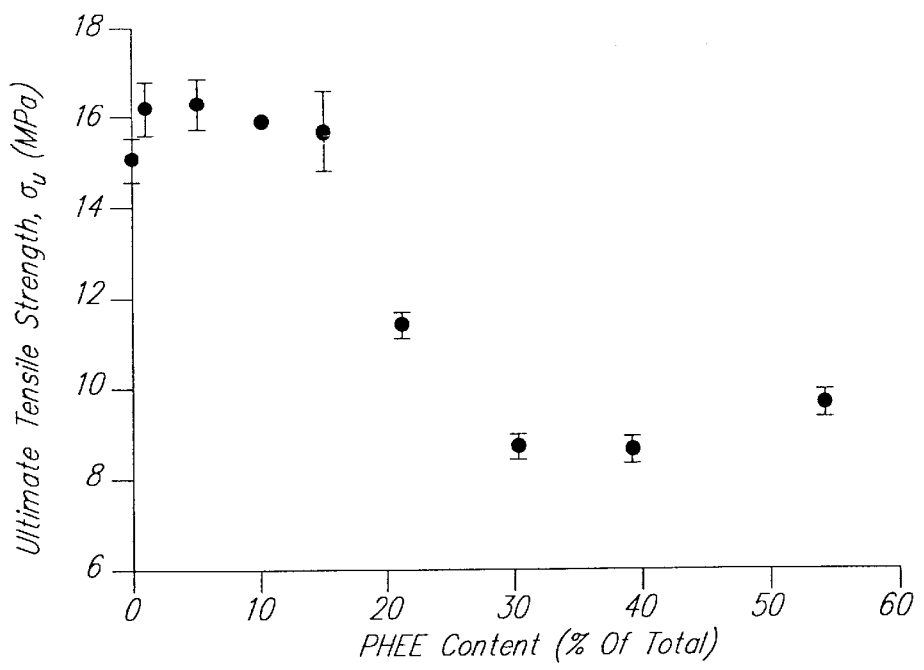
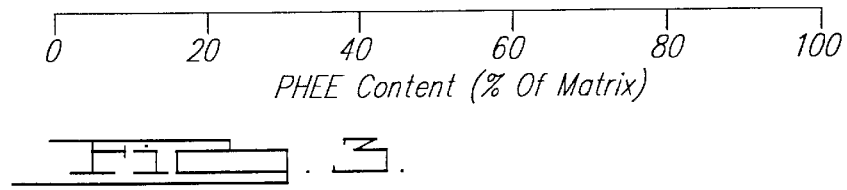
FIG. 3.
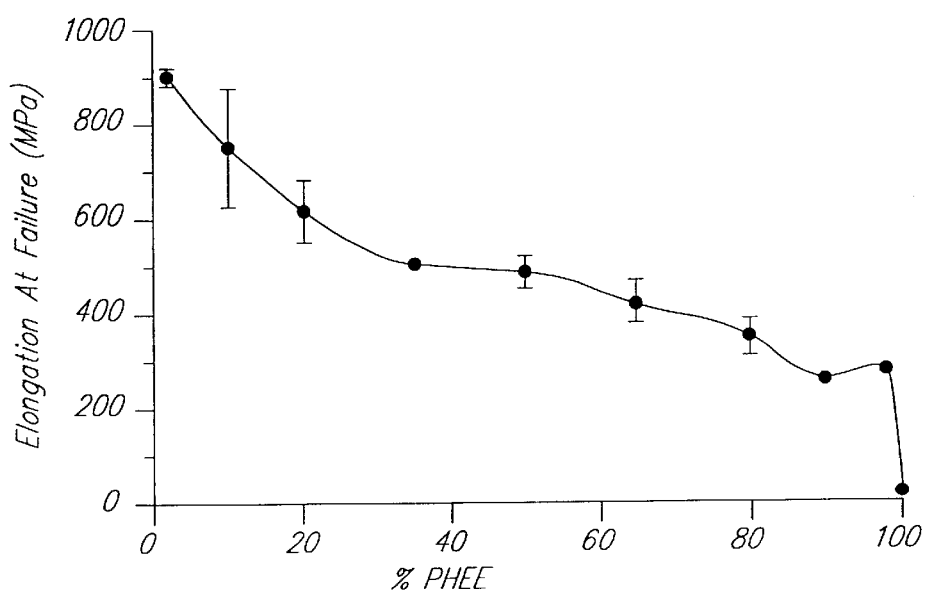
FIG. 4.

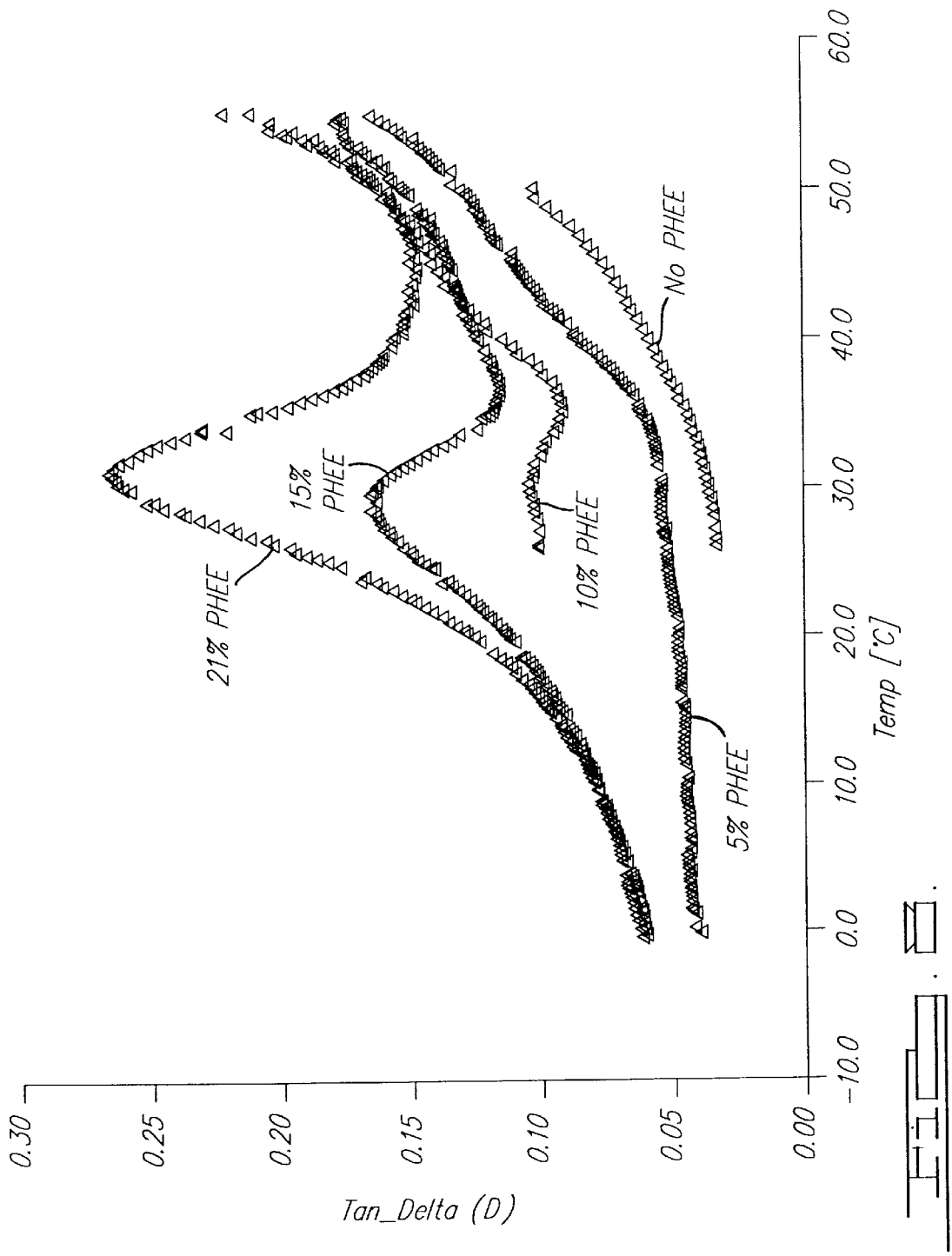

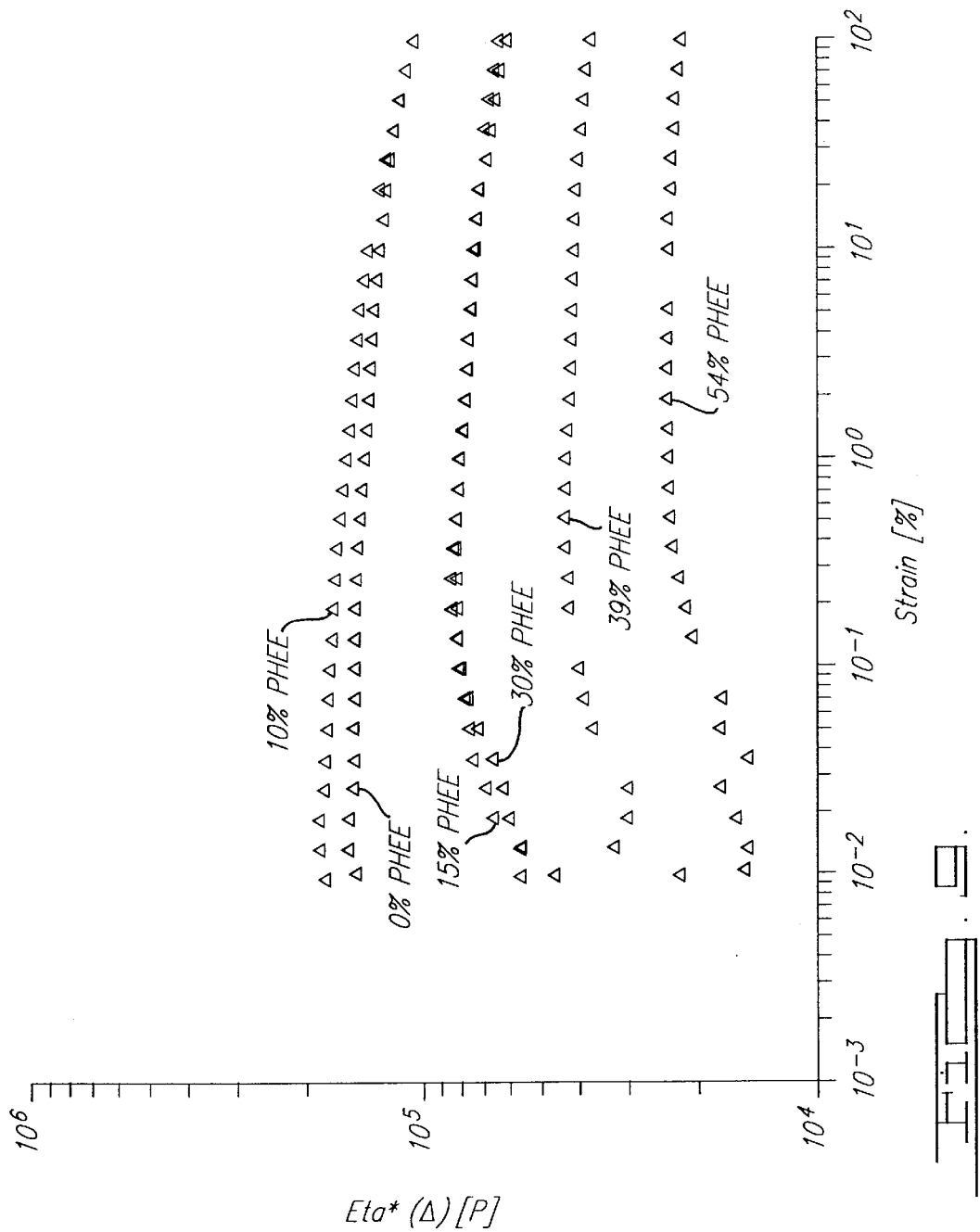

US 6,632,862 B2

BIODEGRADABLE POLYMER COMPOSITIONS, METHODS FOR MAKING SAME, AND ARTICLES THEREFROM

CROSS-REFERENCE TO RELATED APPLICATION(S)

The present application is a Continuation-in-Part of application Ser. No. 09/784,701, filed Feb. 15, 2001, now U.S. Pat. No. 6,362,256, which is a continuation of application Ser. No. 09/289,702, filed Apr. 12, 1999, now U.S. Pat. No. 6,191,196.

GOVERNMENT RIGHTS IN INVENTION

The present invention was made with government support under Grant Agreement No. 59-3K95-3-126 awarded by the United States Department of Agriculture, Agricultural Research Services. The government has certain rights in this invention.

BACKGROUND OF THE INVENTION

1. Field of the Invention

The present invention relates generally to polymer compositions and, more particularly, to biodegradable polymer compositions, methods for making same, and articles therefrom.

2. Description of the Related Art

Starches and modified starches have been the focus of considerable research interest in attempts to use these as fillers in order to decrease polymer costs and to use polymers that are biodegradable. Several recent examples, U.S. Pat. No. 5,384,187, issued Jan. 24, 1995, to inventors Uemura et al., U.S. Pat. No. 5,391,423, issued Feb. 21, 1995, to inventors Wnuk et al., and U.S. Pat. No. 5,412,005, issued May 2, 1995, to inventors Bastioli et al., all represent domestic and foreign based attempts to achieve biodegradable polymer compositions in which natural polymers such as starches have been added to hydroxy-functional polymers.

Recent biodegradable polymer compositions have included a starch or a modified starch and a hydroxy-functional polymer. An example of such a biodegradable polymer composition is disclosed in U.S. Pat. No. 5,852,078, issued Dec. 22, 1998, to inventors Willett et al. This biodegradable polymer composition includes the use of granular starch and thermoplastic poly(hydroxy ester ethers) (PHEE) made with various difunctional acids such as adipic acid. However, uses of this composition may be extremely limited due to the low glass transition temperature of the PHEE made with adipic acid. Most articles formed from this composition easily softened and lost their shape at high temperatures of up to and more than 100° C.

Further, it is known to mix starch with a thermoplastic polyester such as poly(lactic acid) (PLA). It is also known that such a mixture is immiscible and any resultant article formed is brittle with poor material properties. Therefore, there is a need in the art to provide polymer compositions with hydroxy-functional polymers and thermoplastic polyesters that are useful in the manufacture of biodegradable plastics, but which are easily prepared and processed into articles.

SUMMARY OF THE INVENTION

Accordingly, the present invention is a polymer composition. The polymer composition includes a first component being a hydroxy-functional polymer, a second component being a natural polymer and a third component being a thermoplastic polyester. The first component, second component and third component are compounded to form the polymer composition.

Also, the present invention is an article. The article includes a first component being a hydroxy-functional polymer, a second component being a natural polymer and a third component being a thermoplastic polyester. The first component, second component and third component are compounded to form a polymer composition which is processed into the article.

Further, the present invention is a method of making a polymer composition. The method includes the steps of providing a first component being a hydroxy-functional polymer, providing a second component being a natural polymer and providing a third component being a thermoplastic polyester. The method includes the steps of compounding the components to form a polymer composition.

The polymer compositions of the present invention are biodegradable and useful in various processes such as molding, extruding and casting to form molded articles and extruded sheets. The hydroxy-functional polymer may be as described by U.S. Pat. No. 5,171,820, issued Dec. 15, 1992, to inventors Mang et al., U.S. Pat. No. 5,496,910, issued Mar. 5, 1996, to inventors Mang et al., and PCT application published as International Publication No. WO 97/23564, on Jul. 3, 1997, to inventors Mang et al. Natural polymers for mixture with the hydroxy-functional polymers include polysaccharides, modified polysaccharides, naturally-occurring fibers, and particulate fillers. Particularly preferred as the natural polymer are starches. The thermoplastic polyesters for mixture with the natural polymers and hydroxy-functional polymers include poly(lactic acid) (PLA) and poly(caprolactone)(PCL).

One advantage of the present invention is that new polymer compositions are provided which are useful in the manufacture of biodegradable plastics. Another advantage of the present invention is that a method is provided of making such polymer compositions. Yet another advantage of the present invention is that the polymer compositions contain starch and a hydroxy-functional; polymer such as poly(hydroxy ester ether)(PHEE) and a thermoplastic polyester such as poly(lactic acid) (PLA) or poly(caprolactone) (PCL). Still another advantage of the present invention is that the method compounds the composition in at least one compounding step. A further advantage of the present invention is that the compounded composition is pelletized for further processing in various processes such as injection molding. Yet a further advantage of the present invention is that the polymer compositions are biodegradable and allow molded items to be formed such as planter pots, disposable razors, cutlery, pen casings, etc.

Other features and advantages of the present invention will be readily appreciated as the same becomes better understood after reading the subsequent description, examples and the appended claims.

BRIEF DESCRIPTION OF THE DRAWINGS

FIG. 3 is a graph of ultimate tensile strength versus PHEE content for the biodegradable polymer compositions, methods for making same, and articles therefrom, according to the present invention.

FIG. 7 is a graph of loss modules versus temperature for the biodegradable polymer compositions, methods for making same, and articles therefrom, according to the present invention.

FIG. 8 is a graph of tan delta versus temperature for the biodegradable polymer compositions, methods for making same, and articles therefrom, according to the present invention.

FIG. 9 is a graph of strain sweeps versus strain for the biodegradable polymer compositions, methods for making same, and articles therefrom, according to the present invention.

DESCRIPTION OF THE PREFERRED EMBODIMENT(S)

Figure 1:
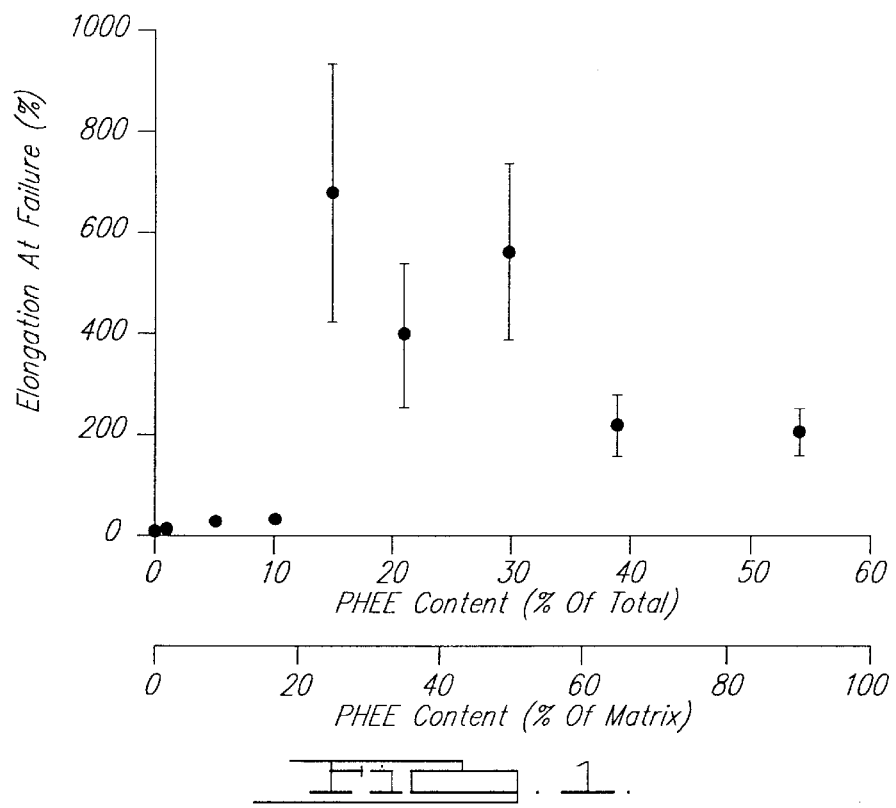
FIG. 1 is a graph of elongation at failure versus PHEE content for the biodegradable polymer compositions, methods for making same, and articles therefrom, according to the present invention.

Broadly, the present invention is a polymer composition comprising three main components: the first component is a hydroxy-functional polymer, more particularly, a hydroxy-functional polyester having a repeating structure as will hereinafter be described. The hydroxy-functional polymer may be, for example, a thermoplastic poly(hydroxy ester ether) (PHEE). The second component is a natural polymer. The natural polymer may be, for example, a polysaccharide, a modified polysaccharide, or a naturally occurring fiber or particulate filler, but preferably is starch or a modified starch. The third component is a thermoplastic polyester. The thermoplastic polyester may be, for example, a thermoplastic poly(lactic acid) (PLA) or a thermoplastic poly (caprolactone) (PCL).

While the amount of the hydroxy-functional polymer selected for use depends on a variety of factors, including the specific polymer employed and the desired end uses of the composition, in general hydroxy-functional polymers can be present in an amount of from 1 to 99 wt. %, preferably from 1 to 95 wt. %, and most preferably from 10 to 90 wt. %, based on the total weight of the composition. Preferably, the thermoplastic polyester is a poly(lactic acid) (PLA) or a poly(caprolactone) (PCL), present in amounts of about equal to or greater than the amount of the hydroxy-functional polymer used in the formulation of the composition.

Natural polymers contemplated for use include biodegradable organic fillers, such as cellulose and other fibers and the like, which are well known. Naturally occurring fibers or particulate fillers which can be employed in the practice of the present invention for preparing the composition are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof. Polysaccharides which can be employed in the practice of the present invention for preparing the composition are the different starches, celluloses, hemicelluloses, gums, pectins, and pullulans. Polysaccharides are known and are described, for example, in *Encyclopedia of Polymer Science and Technology,* 2nd edition, 1987.

Modified polysaccharides which can be employed in the practice of the present invention for preparing the composition are the esters and ethers of polysaccharides, such as, for example, cellulose ethers and cellulose esters, or starch esters and starch ethers. Modified polysaccharides are known and are described, for example, in *Encyclopedia of Polymer Science and Technology,* 2nd edition, 1987.

The natural polymer is in a granular form (hereinafter referred to as the "granular embodiment"). When practicing the granule embodiment of the present invention, the granules of natural polymer preferably will have a particle size of less than about 100 $\mu$m, and more preferably have a particle size of up to about 50 $\mu$m and a water content of less than about 15 wt. %, more preferably less than about 10 or 11 wt. %. In the granule embodiment, the three main components may be admixed in varying amounts. The natural polymer may be present in a trace amount or in greater amounts up to about 70 wt. %.

Suitable Hydroxy-Functional Polymers

The preparation and structures for hydroxy-functional polymers, such as hydroxy-functional polyesters, suitable in practicing the present invention may be as described by U.S. Pat. No. 5,171,820, issued Dec. 15, 1992, to inventors Mang et al., and U.S. Pat. No. 5,496,910, issued Mar. 5, 1996, to inventors Mang et al., the disclosures of which are hereby incorporated in their entireties by reference. Such useful hydroxy-functional polyesters for the present invention may be prepared from base-catalyzed nucleophilic addition of suitable acids to epoxies, which reaction generates both an ester linkage and a pendent hydroxyl group. Transesterification and cross linking reactions are eliminated through use of quaternary ammonium halide salts as initiators for the reaction of diacids with diglycidyl ethers, providing convenient preparation of high molecular weight, thermoplastic, hydroxy-functional polyesters in ether solvents at temperatures from 80° C.–160° C. Data provided by the Dow Chemical Company (manufacturer of hydroxy-functional polyesters such as described by U.S. Pat. Nos. 5,171,820 and 5,496,910) indicates the biodegradable nature of these polymers through the ability of various soil bacteria (such as *Pseudomonas putida*) to use the synthetic polymers as a substrate for cell culture growth.

Representative structures for suitable hydroxy-functional polyesters in practicing the present invention are represented by Formula A (where n provides a sufficient molecular weight, such as for example a m.w. of about 50,000–100,000. Higher molecular weights are preferred due to higher strength.

FORMULA A

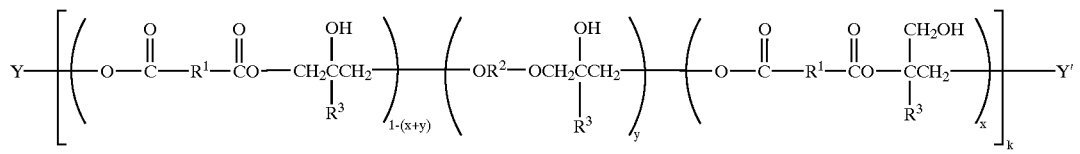

In Formula A each of $R^1$ and $R^2$ is individually a divalent Organic moiety which is predominately hydrocarbon, each $R^3$ is individually a hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Thus, suitable polyesters have repeating units represented by Formula B (where each of $R^1$, $R^2_1$, $R^3$, x and y are as defined above).

Such polyesters may be prepared from diglycidyl esters of an aliphatic diacid such as adipic acid due to the ready availability and reasonable price for adipic acid as a source of reactant. Other particularly preferred polyesters may be prepared from dihydric phenols, such as hydroquinone.

Four particularly preferred hydroxy-functional polyesters, used extensively to illustrate (but not to limit) the present invention, are sometimes hereinafter designated "BIS CHD," "BIS adipic," "HQ DDCA" and "BIS DDCA." These polymers will include some repeating unit structures, where the repeating units are illustrated respectively by Formulas C–F.

FORMULA B

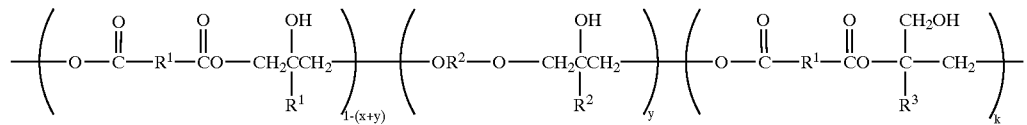

FORMULA C

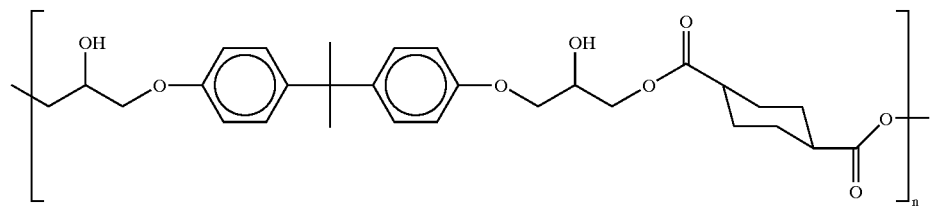

FORMULA D

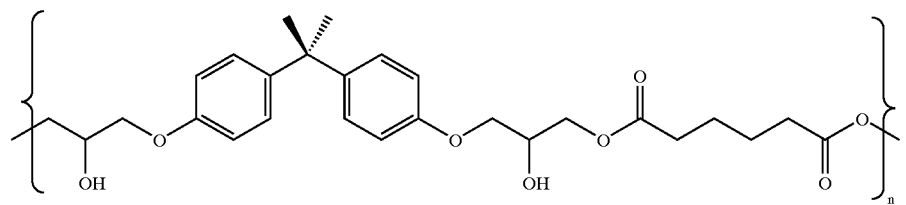

FORMULA E

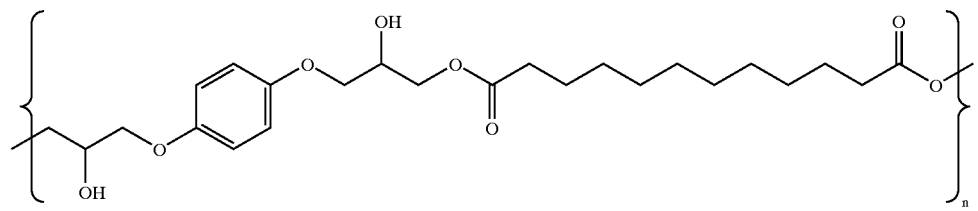

FORMULA F

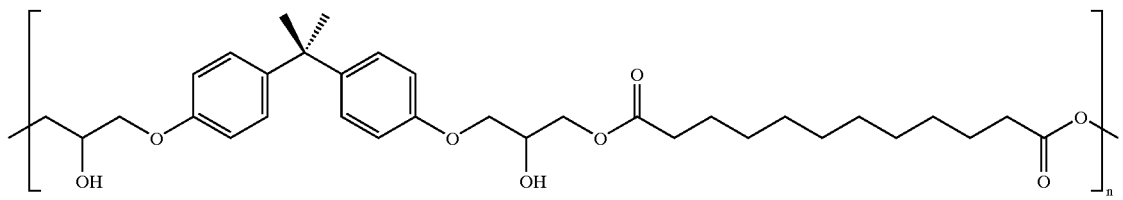

In Formulas C–F, "n" preferably is as earlier described.

Other suitable hydroxy-functional polymers for practicing the present invention are described by Formula I in PCT application published as International Publication No. WO 97/23564, on Jul. 3, 1997, to inventors Mang et al. The below illustrated repeating structure described by U.S. Pat. No. 5,496,910, issued Mar. 5, 1996, to inventors Mang et al., incorporated herein by reference and designated here as Formula I is believed to encompass Formula B.

Thus, the Formula I polymers have repeating units represented the formula:

  I wherein $R^a$ individually represents a divalent organic moiety which is predominately hydrocarbylene (where the term "hydrocarbylene" means a divalent aliphatic hydrocarbon moiety, such as alkylene, alkenylene or cycloalkylene having 2 to 20 carbons and optionally containing a heteroatomic group, such as oxygen, sulfur, amino, sulfonyl, carboxyl, carbonyl or sulfoxyl, in the chain or pendant thereto) or a combination of different organic moieties which are predominantly hydrocarbylene; $R^c$ is

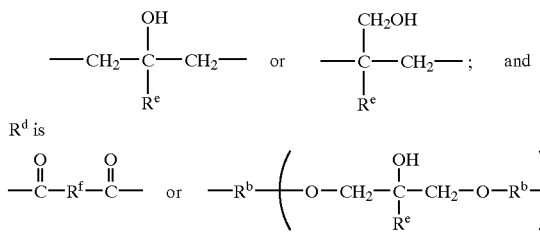

wherein $R^b$ is a divalent organic moiety which is predominantly hydrocarbylene or

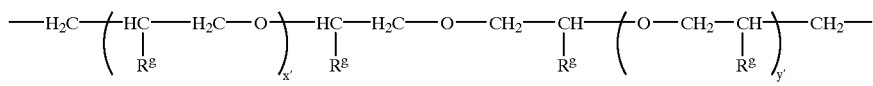

$R^e$ is hydrogen or lower alkyl, such as methyl, ethyl, butyl and propyl, more preferably hydrogen, $R^f$ is independently an organic moiety which is predominantly hydrocarbylene, $R^g$ is independently hydrogen or methyl, n' is an integer from about 0 to about 100, and x' and y' are independently integers from 0 to 100.

Representative divalent organic moieties useful as $R^a$, $R^b$, and $R^f$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group, arylene, dialkylenearylene, diarylenketone, diarylenesulfone, diarylene oxide, and diarylene sulfide.

In the more preferred hydroxy-functional polyethers, $R^a$, $R^b$ and $R^f$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene, or 1,2-cyclohexylene optionally substituted with at least one hydroxyl group, p-phenylene, m-phenylene, or 2,6-naphthalene, diphenyleneisopropylidene, sulfonyldiphenylene, carbonyldiphenylene, oxydiphenylene, or 9,9-fluorenediphenylene and n' is from 0 to 10.

The polymers represented by Formula I may be prepared by reacting diglycidyl esters or aliphatic or aromatic diacids such as diglycidyl terephthalate, or diglycidyl ethers of dihydric phenols or alcohols with aliphatic or aromatic diacids such as adipic or terephthalic acid. Thus, suitable polymers for the present invention can be prepared by reacting a hydroxy-functional aliphatic diacid, optionally in the presence of another diacid, with a diglycidyl ether or diglycidyl ester or a mixture of diglycidyl ethers or diglycidyl esters at conditions sufficient to cause the acid moieties to react with the epoxy moieties to form a polymer backbone having ester linkages, as described in U.S. Pat. No. 5,171,820.

Natural Polymers

Among the natural polymers suitable for practicing the present invention are the particularly preferred starches. Starch is a low-cost and abundant natural polymer composed of amylose and amylopectin. Amylose is essentially a linear polymer having a number average molecular weight in the range of 100,000–500,000, whereas amylopectin is a highly branched polymer having a number average molecular weight of up to several million. Unmodified, natural starches are obtained in granular form and may be derived from cereals or grains (such as corn, wheat, rice and sorghum), roots (such as cassava), legumes (such as peas), and tubers such as potato and canna. Such starch granules typically have a particle size less than about 50μm, which is the preferred particle size when practicing the granule embodiment. While less preferred, flours whose contents are predominately starch, and which may also contain protein, oil and fiber, are operative in the present invention. While such other natural polymers are used for granular embodiment formulations, they will be processed so as to be in granular form and preferably will have a relatively uniform particle size of about 50 µm or less.

Starch granules for use in the granule embodiment will normally have a water content of less than about 15 wt. %, more preferably less than about 10–11 wt. %. As will be exemplified, granules may be pre-dried to less than about 1% moisture before compounding. Although preferred, pre-drying is not necessary.

Derivatized (modified) starches are also suitable for use in the present invention. "Derivatized starches" is meant to include starches which have been chemically treated so as to form starch esters, starch ethers, and cross-linked starches. "Modified" is meant that the starch can be derivatized or modified by typical processes known in the art (e.g. esterification, etherification, oxidation, acid hydrolysis, cross-linking and enzyme conversion). Typically, modified starches include esters, such as the acetate ester of dicarboxylic acids/anhydrides. Particularly useful are the alkenyl-succinic acids, anhydrides, ethers (such as the hydroxyethyl and hydroxypropyl starches), starches oxidized with hypochlorite, starches reacted with cross-linking agents such as phosphorus oxychloride, epichlorhydrin, hydrophobic cationic epoxides, and phosphate derivatives prepared by reaction with sodium or potassium orthophosphate or tripolyphosphate and combinations thereof. These and other conventional modifications of starch are described in publications such as *Starch: Chemistry and Technology,* 2nd edition, editor Whistler et al., and *Starch Derivatives: Production and Uses,* Rutenberg et al., Academic Press, Inc. 1984.

For example, starch esters may be prepared using a wide variety of anhydrides, organic acids, acid chlorides, or other esterification reagents. Examples of anhydrides are acetic, propionic, butyric, and so forth. Further, the degree of esterification can vary as desired, such as from one to three per glucosidic unit of the starch, or as appropriate given the number of hydroxyl groups in the monomeric unit of the natural polymer, if selected to be other than starch. Similar or different esterified natural polymers, with varying degrees of esterification, can be blended together for practicing the present invention. Although esterified starches are stable to attack by amylases, in the environment the esterified starches are attached by microorganisms secreting esterases which hydrolyze the ester linkage.

Starch esters tend to be hydrophobic in contrast to starch raw materials (that is, derived by usual techniques from natural sources such as corn). Thus, depending upon the particular application, one may prefer to choose an hydrophobic starch ester rather than a hydrophilic starch in formulating compositions of the present invention.

Although starches are preferred for use as the natural polymers, particularly due to ready availability and low cost, but as earlier noted, other suitable natural polymers (in or prepared to be in granular form of a suitable particle size) are hydroxyl containing polymers such as cellulose, hemicellulose, chitin, guar gum, locust bean gum, pectin, xanthan, algin, agar, and dextran. Some of these can play the role of filler. Excellent results have been obtained with both granulated guar gum and cellulose powder.

Suitable Thermoplastic Polyesters

The composition includes a thermoplastic polyester. Among the thermoplastic polyesters, a poly(lactic acid) (PLA) and poly(caprolactone) (PCL) are preferred. The PLA and PCL are prepared and used in a pelletized form. Examples of other suitable thermoplastic polyesters include polyhydroxy(butyrate-co-valerate) (PHBV), bionolle, and cellulose acetate. PCL is a commercially available biodegradable polyester which has been used with thermoplastic starch to make films and is a component of some of the Mater-B, i.e. starch-based materials sold by Novamont of Novara, Italy. It should be appreciated that these thermoplastic polyesters are conventional and known in the art.

The thermoplastic polyesters may be prepared with additives to increase the rate of crystallization. For example, an additive such as boron nitride may be added to a thermoplastic polyester such as poly(lactic acid) (PLA) to increase the rate of crystallization of the PLA. It should be appreciated that other suitable additives may be added to the thermoplastic polyester to increase the crystallization.

Other Components

A plasticizer can be added to the inventive compositions to achieve greater material processability and product flexibility, although plasticizers typically soften the compositions in which they are included. This is not always true, however, of compositions of the present invention, as will be discussed hereinafter. Molded articles prepared from blends including plasticizers preferably use plasticizers that are biodegradable. Examples of biodegradable plasticizers include various esters, such as phthalate esters, and various other biodegradable esters known in the chemical arts.

Inorganic fillers can be added, such as talc, calcium carbonate, diatomaceous earth, and so forth.

Other optional components known in the art, including, but not limited to, anti-blocking agents, anti-static agents, slip agents, pro-heat stabilizers, antioxidants, pro-oxidant, and additives may be incorporated, depending upon the application.

Method of Making

A method, according to the present invention, is provided for making a polymer composition. In general, the method includes providing a first component being a hydroxy-functional polymer, providing a second component being a natural polymer such as starch and providing a third component being a thermoplastic polyester such as poly(lactic acid)(PLA) or poly(caprolactone)(PCL). The method includes mixing these components in a single screw extruder, a twin screw extruder, a Banbury mixer, a roll mill or any intensive mixer at a temperature and for a time sufficient to provide an intimate, well-dispersed mixture of the components. Preferably, the components are brought together and compounded in an appropriate melt extruder from which the blend is extruded in the form of strands or sheets. The strands or sheets are then pelletized and molded into articles by conventional processes such as injection molding. The method may include the step of forming bars from the sheets.

Experimental

Aspects of the present invention will now be illustrated, without intending any limitation, by the following examples. Unless otherwise indicated, all parts and percentages are by weight.

EXAMPLE 1

Compositions of the present invention were made by the method, according to the present invention. Granules of starch, in this example cornstarch, pellets of PHEE Adipic (Adipic) and pellets of poly(lactic acid) (PLA) were provided and admixed. The granules of starch were pre-dried to approximately 1 wt. % moisture. These components were hand mixed and compounded. This compounding was performed on a Brabender PL2000 torque rheometer using a mixing screw with a fluted dispersive mixing section and a notched distributive section. Temperatures during the compounding ranged from about 120° C. to about 180° C. The resultant compositions were in the initial form of strands, which were then air cooled and pelletized. Specific compositions were chosen so that the final compounded pellets included as follows: Sample #1 is 60 wt. % starch and 40 wt. % resin (PLA/Adipic), of which the 40 wt. % resin consisted of 90% PLA and 10% Adipic, for a ratio of 60/36/4 of starch/PLA/Adipic; Sample #2 is 60 wt. % starch and 40 wt. % resin (PLA/Adipic), of which the 40 wt. % resin consisted of 50% PLA and 50% Adipic, for a ratio of 60/20/20 of starch/PLA/Adipic; and Sample #3 is 60 wt. % starch and 40 wt. % resin, of which the 40 wt. % resin consisted of 10% PLA and 90% Adipic, for a ratio of 60/4/36 of starch/PLA/Adipic. The pellets formed were re-fed to the Brabender PL2000 torque rheometer, but fitted with a slit die (3.54 cm×0.5 mm) to form a thin sheet. The sheets were stamped to form tensile bars for subsequent physical testing. Sample #1 did not provide a smooth sheet and it was difficult to stamp out representative tensile bars. Sample #2 provided tensile bars that had a tensile strength of 17.6 MPa and Sample #3 provided tensile bars that had a tensile strength of 30.4 MPa.

EXAMPLE 2

Compositions of the present invention were made using cornstarch, PLA and Adipic. Starch/Adipic (60/40) pellets were prepared and processed on a ZSK 30 Twin Screw Extruder. Moisture content of the starch was 4% to provide 60/40 pellets with a moisture content of approximately 2.4%. Samples of the composition were prepared by blending into the starch/Adipic (60/40) pellets various levels of the PLA pellets. The PLA pellets were added to make five different compositions which were compounded on the Brabender PL2000 torque rheometer of Example 1. Pellets were formed as in Example 1 and re-fed to the Brabender as in Example 1. The extrudates of the various compositions were thin sheets that were stamped to provide tensile bars for subsequent physical testing. Several properties of the various compositions tested are summarized in Table A.

allowing the tensile bars to remain for 7 days at 50% RH and 23° C., tensile properties were determined and summarized in Table B.

TABLE B

| Sample | Starch % | Adipic % | PLA % | Tensile (MPa) |
| --- | --- | --- | --- | --- |
| 1 | 50 | 15 | 35 | 27 |
| 2 | 50 | 20 | 30 | 28 |
| 3 | 50 | 25 | 25 | 33 |

EXAMPLE 4

Dynamic mechanical analysis (DMA) was used to determine changes in the processed strands of composition of Example 3 after a particular heating period. A temperature of 120° C. was selected and strands of composition were removed from an oven at zero minutes, 10 minutes, 20 minutes, 30 minutes, 40 minutes and 60 minutes. These heated strands were used for DMA. Samples of the strands showed that changes occurred rapidly with time as probe positions showed less and less movement with heating. At the temperature for 40 and 60 minutes, there was little movement as the temperature neared a melting temperature of 150° C.

EXAMPLE 5

Additional compositions of 60 wt. % starch were made as in Example 1. Starch was dried to approximately 1% moisture and hand mixed with various levels of Adipic and PLA as in Example 1. Samples were processed on the Brabender and thin sheets were formed as in Example 1. The thin sheets were stamped into tensile bars and tensile properties were obtained. The properties are summarized in Table C.

TABLE C

| Sample | Starch | Adipic | PLA | Tensile (MPa) |
| --- | --- | --- | --- | --- |
| 1 | 180 g | 24 g | 96 g | 14 |
| 2 | 180 g | 36 g | 84 g | 17 |
| 3 | 180 g | 48 g | 72 g | 21 |

TABLE A

| Sample No. 16191-2 | Mass 60/40 | PLA added | % PLA (tot) | % Starch | % Adipic | Adipic/PLA | % PLA | Tensile (MPa) |
| --- | --- | --- | --- | --- | --- | --- | --- | --- |
| 1 | 96 | 4 | 4 | 57.6 | 38.4 | 9.6 | 9.4 | 31 |
| 2 | 92 | 8 | 8 | 55.2 | 36.8 | 4.6 | 17.9 | 25 |
| 3 | 88 | 12 | 12 | 52.8 | 35.2 | 2.9 | 25.4 | 21 |
| 4 | 84 | 16 | 16 | 50.4 | 33.6 | 2.1 | 32.3 | 25 |
| 5 | 80 | 20 | 20 | 48 | 32 | 1.6 | 38.5 | 29 |

EXAMPLE 3

Formulations of starch and resin were prepared into several compositions as in Example 1. These compositions contain 50 wt. % starch and 50 wt. % resin. The 50 wt. % resin consisted of 15 wt. % Adipic and 35 wt. % PLA; 20 wt. % Adipic and 30 wt. % PLA; and 25 wt. % Adipic and 25 wt. % PLA. The formulations were hand mixed and compounded on the Brabender PL2000 torque rheometer as previously described in Example 1. Thin sheets were obtained as in Example 1 for stamping out tensile bars. After

EXAMPLE 6

Samples of the composition were prepared from starch, Adipic and PLA as in Example 1. The samples were hand mixed and compounded on the Brabender as in Example 1. The compounded samples were pelletized and used for injection molding on a Cincinnati Milicron 75T to form molded tensile bars. Tensile properties were obtained and summarized in Table D.

TABLE D

| Sample | Starch | Adipic | PLA | Tensile (MPa) |
|---|---|---|---|---|
| 1 | 908 g | 363 g | 545 g | 38.6 |
| 2 | 1090 g | 291 g | 436 g | 34.1 |

EXAMPLE 7

Several samples of the composition were prepared with starch at a level of 40 wt. %, 50 wt. %, 55 wt. %, 60 wt. %, 65 wt. % and 70 wt. % and various levels of Adipic and PLA as in Example 1. The samples were hand mixed, compounded on the Brabender and pelletized as in Example 1. The pellets were used for injection molding on the Cincinnati Milicron 75T to form molded tensile bars as in Example 6. Tensile properties were obtained and summarized in Table E.

TABLE E

| Sample | Starch % | Adipic % | PLA % | Tensile (MPa) |
|---|---|---|---|---|
| 1 | 40 | 26.7 | 33.3 | 39 |
| 2 | 50 | 15 | 35 | 28 |
| 3 | 50 | 10 | 40 | 28 |
| 4 | 55 | 11 | 34 | 28 |
| 5 | 60 | 12 | 28 | 32 |
| 6 | 65 | 10.5 | 24.5 | — |
| 7 | 70 | 9 | 21 | — |

EXAMPLE 8

A composition of starch 50 wt. %, Adipic 20 wt. % and 30 wt. % PLA was prepared and hand mixed. Sufficient boron nitride was added into the hand mixed composition to increase the rate of crystallization of PLA and to be approximately 1 wt. % of the PLA added. The composition was compounded on the Brabender and pelletized as in Example 1. The pellets were used for injection molding on the Cincinnati Milicron 75T to form molded tensile bars as in Example 6. Tensile properties of the tensile bars were 29 MPa. DMA gave curves similar to a composition made without boron nitride.

EXAMPLE 9

Attenuated Total Reflectance by FTIR data was obtained for the samples in the Example 7. The spectra were compared to spectra of PLA and Adipic. The surfaces of the tensile bars consited mostly of PLA. Also, partial spectra of Apidic could be seen.

EXAMPLE 10

Two compositions were prepared, one with starch 49.5 wt. %, Apidic 19.8 wt. % and PLA 29.7 wt. %, and the other with starch 59.4 wt. %, Adipic 15.8 wt. % and PLA 23.8 wt. %. To each composition was added WaxOP of 1 wt. % as an external lubricant to assist in compounding and injection molding. The compositions were hand mixed and then compounded on a Leistritz Extruder. Strands produced from the Leistritz were pelletized. The pellets were used for injection molding on a Cincinnati Milicron 75T to form molded tensile bars as in Example 6. For injection molding, a mold temperature of either 205° F. or 150° F. was selected. Mold hold times were selected as 20 seconds or 60 seconds. Tensile bars were molded, collected and stored at 50% RH and 23° C. Another two compositions were prepared, one with starch 63.7 wt. %, Adipic 13.7 wt. % and PLA 20.67 wt. %, and the other with starch 68.6 wt. %, Adipic 11.8 wt. % and PLA 17.6 wt. %. To each composition was added WaxOP of 2 wt. % as an external lubricant to assist in compounding and injection molding. The compositions were hand mixed and then compounded with a Leistritz Extruder. Strands from Leistritz were pelletized. The pellets were used for injection molding on a Cincinnati Milicron 75T to form molded tensile bars as in Example 6. For injection molding, a mold temperature of 210° F. was selected for the 63.7 wt. % starch composition and 150° F. was selected for the 68.6 wt. % starch composition. The tensile properties are summarized in Table F.

TABLE F

| Sample | Starch | Adipic | PLA | Mold Temp | Mold Time | Tensile (MPa) |
|---|---|---|---|---|---|---|
| 1 | 49.5 | 19.8 | 29.7 | 205 | 20 | 34 |
| 2 | | | | 205 | 60 | 31 |
| 3 | | | | 150 | 20 | 33 |
| 4 | | | | 150 | 60 | 35 |
| 5 | 59.4 | 15.8 | 23.8 | 205 | 20 | 34 |
| 6 | | | | 205 | 60 | 37 |
| 7 | | | | 150 | 20 | 40 |
| 8 | | | | 150 | 60 | 33 |
| 9* | 54.5 | 14.5 | 30.1 | 150 | 20 | 39 |
| 10 | 63.7 | 13.7 | 20.6 | 210 | 20 | 37 |
| 11 | | | | 210 | 60 | 34 |
| 12 | 68.6 | 11.8 | 17.6 | 217 | 20 | 33 |
| 13 | | | | 217 | 60 | 38 |

*Sample 9 was prepared by taking 100 g of pellets from the 60 wt. % starch composition and blending into it 10 g of PLA. The blended sample was fed into the Cincinnati Milicron 75T to form molded tensile bars.

EXAMPLE 11

Tensile bars from samples in Example 10 were selected for heating trials. Tensile bars containing 49.5 wt. % starch, 63.7 wt. % starch and 68.6 wt. % starch were heated at 100° C. in an oven for 30, 15, 10, 5, 2.5 or 0 minutes. The heated tensile bars, after a brief cooling, were placed in a 2000 ml beaker filled to approximately 1500ml with water heated to 98° C. to 100° C. on a heating plate. Water was kept at 98° C. to 100° C. during the heating trials. Tensile bars were immersed in the heated water at about a 45 degree angle so that one could observe any bending of the tensile bars with time in the heated water. All tensile bars that were not heated in the oven, zero time, rapidly bent in a few seconds. Tensile bars heated for 2.5 minutes also bent within several seconds. All of the other tensile bars heated in the oven for 5, 10, 15 or 30 minutes retained their shape for one hour in the heated water. Upon removal from the heated water, the zero time and 2.5 minute time gave tensile bars that were bent while the other tensile bars retained their shape.

EXAMPLE 12

Dry starch has been found useful in compositions of the present invention. The compositions were prepared using two types of starch, one normal cornstarch (Buffalo 3401, Formula I) and a 3:1 blend of potato and rice starches (Formula II). The starches were pre-dried to less than 1% moisture content and then compounded in a ZSK-30 Twin Screw Extruder with Apidic at a 60/40 ratio. Strands from the extruder were pelletized. The pellets were mixed with PLA to give a final ratio of 40/27/33 starch/Apidic/PLA and passed through a Brabender 19 mm Single Screw Extruder using a fluted mixing screw at 160° C. Resulting pellets were injection molded to form molded tensile bars on a Cincinnati Milacron injection molder. Formula I had a tensile strength of 43 MPa, elongation of 4.3% and Young's Modulus of 1.4 GPa. Formula II had a tensile strength of 45 MPa, elongation of 4.1% and a Young's Modulus of 1.5 Gpa.

EXAMPLE 13

Compositions were prepared using the steps previously outlined in Example 1. The compositions made consisted of 60 wt. % starch and 40 wt. % Adipic/polyhydroxy(butyrate-co-valerate) (PHBV). Resin blends Adipic and PHBV were then compounded on the Brabender as in Example 1. Resin ratios varied from 90/10, 50/50 and 10/90. Pellets of the combined resins were blended with starch and compounded on the Brabender. Strands from the Brabender were pelletized. The pellets were re-Eed to the Brabender fitted with a slit die. Thin slit films were collected and stamped to form tensile bars. Tensile properties were 12.3 MPa for the 50/50 resin composition and 26.3 MPa for the 90/10 Adipic PHBV.

EXAMPLE 14

Compositions were prepared using Adipic polyester. The Adipic polyester was hand mixed with equivalent amounts of other additional resins. The mixed 50/50 samples were Adipic Bionolle, Adipic Eastman cellulose acetate, and Adipic polycaprolactone. Each of these mixtures were blended with starch to give three compositions of starch 60 wt. % and mixed resins 40 wt. %. These compositions were compounded on the Brabender fitted with a slit die. Tensile bars were stamped from the thin films from the die for physical properties. Tensile properties were 11.8 MPa for the Bionolle, 8.4 MPa for the cellulose acetate and 12.5 MPa for the polycaprolactone.

EXAMPLE 15

Figure 2:
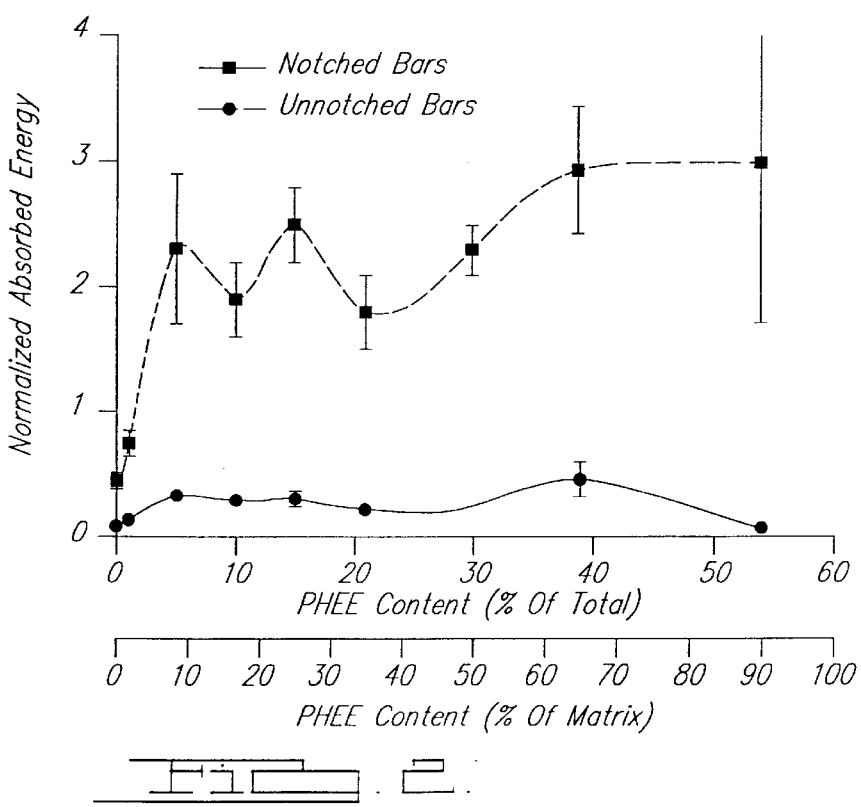
FIG. 2 is a graph of normalized absorbed energy versus PHEE content for the biodegradable polymer compositions, methods for making same, and articles therefrom, according to the present invention.

Compositions were prepared using poly(caprolactone) (PCL). Various PCL/PHEE blends and starch filled formulations were prepared. Granules of starch, pellets of PHEE Adipic(Adipic) and pellets of poly(caprolactone)(PCL) were provided. The granules of starch were pre-dried to approximately 1 wt. % moisture. The various PCL/PHEE blends ratios were 0/100, 2/98, 10/90, 20/80, 35/65, 50/50, 65/35, 80/20, 90/10, and 100/0. These components were hand mixed and compounded. This compounding was performed on a ZSK-30 Twin Screw Extruder. Temperatures during the compounding were about 150° C. Speeds during compounding were about 200 rpm. The starch filled formulations were 40 wt. % starch with 0 wt. % PHEE, 1 wt. % PHEE, 5 wt. % PHEE, 15 wt. % PHEE, 20 wt. % PHEE, 21 wt. % PHEE, 30 wt. % PHEE, 39 wt. % PHEE, and 54 wt. % PHEE, equivalent to 0 wt. % PHEE, 1.7 wt. % PHEE, 8.3 wt. % PHEE, 16.7 wt. % PHEE, 35 wt. % PHEE, 50 wt. % PHEE, 65 wt. % PHEE, and 90 wt. % PHEE based on the PCL/PHEE blend matrix (these concentrations are roughly the same as in the unfilled blends). Strands from the extruder were pelletized. Resulting pellets were injection molded to form molded tensile bars (ASTM standard D638M) on a Cincinnati Milicron injection molder for subsequent physical testing. Also, small dogbone bars (gauge Length approximately 25.4 mm) were cut from compression molded sheets of the PCL/PHEE blends for subsequent physical testing. The effect of adding PHEE to the tensile, dynamic mechanical, impact, thermal, and Theological properties of starch filled PCL (Tone 787) was investigated.
Mechanical Properties The mechanical properties tested for Example 15 were Tensile (Instron), Dynamic Mechanical Analyzer (ARES, Perkin Elmer), and Impact (CEAST Resil 5.5 pendulum impact tester with Izod vice). Adding PHEE to starch filled PCL increases the toughness, as shown by the dramatic increase in elongation at failure as illustrated in FIG. 1 and improved impact strength as illustrated in FIG. 2. At 15 wt. % PHEE, the elongation at failure, $e_f$ is over 600%, which is approximately two orders of magnitude larger than $e_f$ for the starch/PCL material and is approaching $e_f$ or unfilled PCL. There is also an increase in $e_f$ at smaller PHEE contents. For example, at 5 wt. % PHEE, the elongation at failure has increased by ~3 times. There is a similar increase in the impact strength of both notched and unnotched samples. By 5 wt. % PHEE, the impact strength of the notched samples has more than tripled and remains approximately constant until the PHEE content exceeds 50 wt. % of the total composition. It should be appreciated that for injection molded formulations with 40 wt. % starch, the elongation or toughness shows a broad maximum of approximately 500% to 600% when the PHEE/PCL ratio is in the range of about 1.4 to about 1.1 It should also be appreciated that at lower PHEE/PCL ratios, the materials have elongations approximately 100 times lower while at higher ratios, the elongation decreases to approximately 200% as illustrated in FIG. 1.

There is also a small increase in the ultimate tensile strength, $\sigma_u$, of the starch filled samples when the PHEE level is between 1 wt. % and 15 wt. % as illustrated in FIG. 3. However, the strength decreases at larger PHEE contents.

Figure 5:
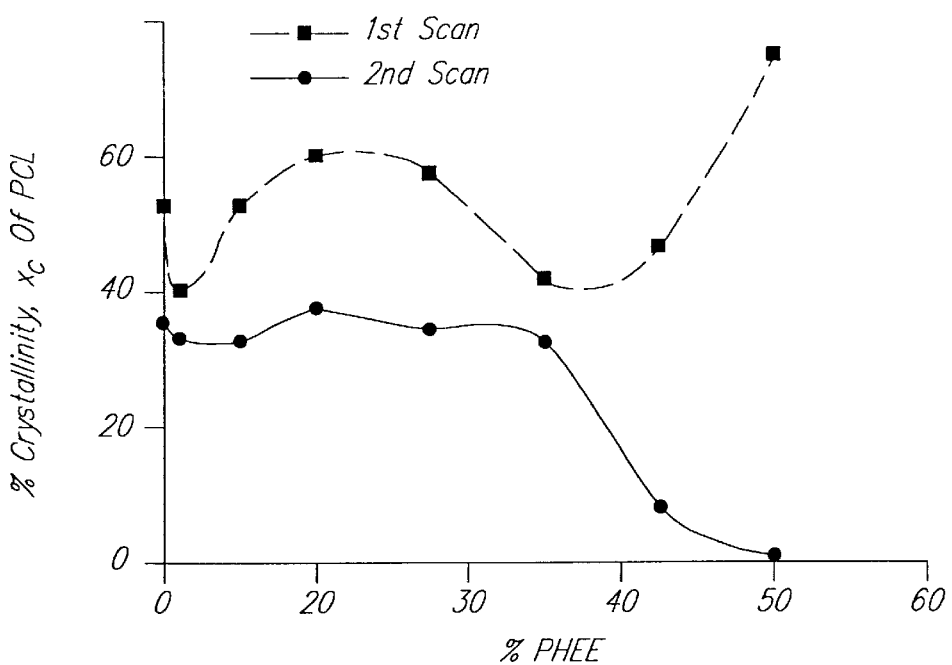
FIG. 5 is a graph of percent crystallinity of PCL versus PHEE content for the biodegradable polymer compositions, methods for making same, and articles therefrom, according to the present invention.
Figure 6:
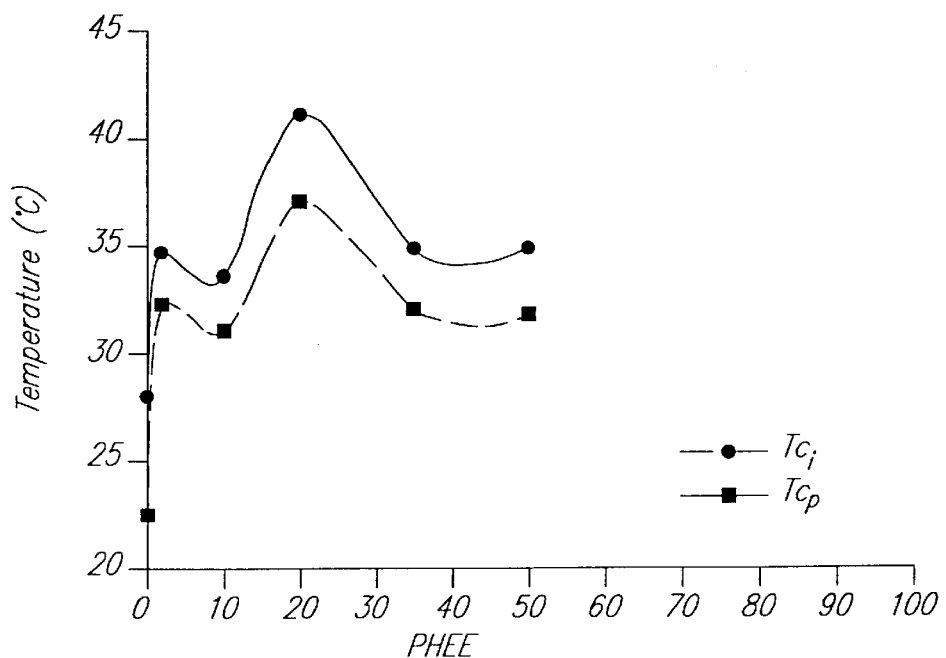
FIG. 6 is a graph of temperature versus PHEE content for the biodegradable polymer compositions, methods for making same, and articles therefrom, according to the present invention.
Figure 4:
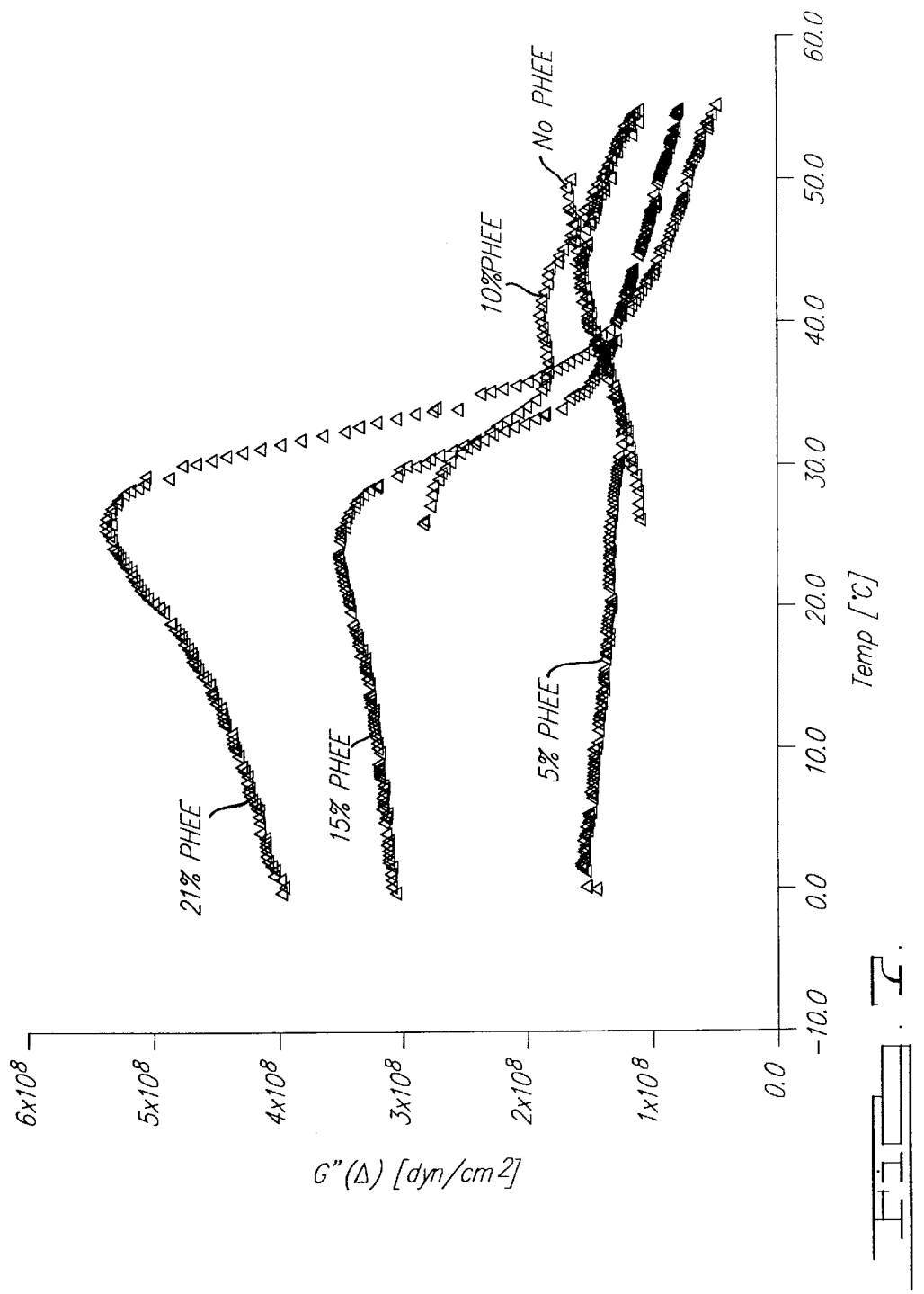
FIG. 4 is a graph of modules and elongation at failure versus PHEE content for the biodegradable polymer compositions, methods for making same and articles therefrom, according to the present invention.

The increase in toughness of the starch filled materials is not simply due to a change in the properties of the matrix. For the unfilled (no starch) PCL/PHEE blends $e_f$ decreases with increasing PHEE content as illustrated in FIG. 4.
Thermal Analysis The thermal properties were analyzed for Example 15 using a Perkin-Elmer DSC 7 analyzer. Thermal analysis showed that PHEE affects the melting temperature $T_m$ and the degress of crystallinity, $X_c$ of PCL as illustrated in FIG. 5. PHEE shifted the crystallization temperature upwards as illustrated in FIG. 6. This behavior was only evident at PHEE contents at or below 50 wt. %. Above this content, there was no evidence of crystallization during the cooling cycle. The results of the thermal analysis indicate that there may be some interaction between PCL and PHEE, but this was not evident in the FTIR studies.
Dynamic Impact The dynamic impact properties were analyzed for Example 15. Temperature sweeps were made from 0° C. to 50° C. at 1° C./min. for the various 40 wt. % starch filled compositions. In this temperature range, the glass transition for PHEE is visible. The $T_g$ for PCL is around −55° C., too low to be detected by this instrument. Both the loss modulus and tan delta data show the presence of two peaks at 5 wt. % PHEE and 10 wt. % PHEE as illustrated in FIGS. 7 and 8. The lower temperature peak at −30° C. to 32° C. is consistent with the PHEE $T_g$ value of 32° C. in PCL/PHEE blends as illustrated in FIG. 4. The higher temperature peak is at ~42° C. It is possible that at low amounts, PHEE is dispersed as very small drops (to be expected considering the very low viscosity of PHEE compared to PCL) and also adsorbed on the starch granule. The adsorbed PHEE would exhibit a higher $T_g$ due to the conformational rigidity. Hence, it is possible that at 15 wt. % PHEE, there is a transition for a dispersed PHEE to a partly continuous one. Under these circumstances, the partly continuous PHEE phase would be physically in contact with the adsorbed PHEE and there would be a single broad $T_g$. It should be appreciated that, as illustrated in FIG. 8, a peak in tan delta indicates a transition in a material and reflects the ability to dissipate large amounts of energy. it should also be appreciated that in the PHEE/PCL range where the elongation is a maximum, a large peak in tan delta (damping) is observed which does not appear to scale directly as the PHEE content, the damping peak grows faster than the PHEE content.

Melt Viscosity

Figure 10:
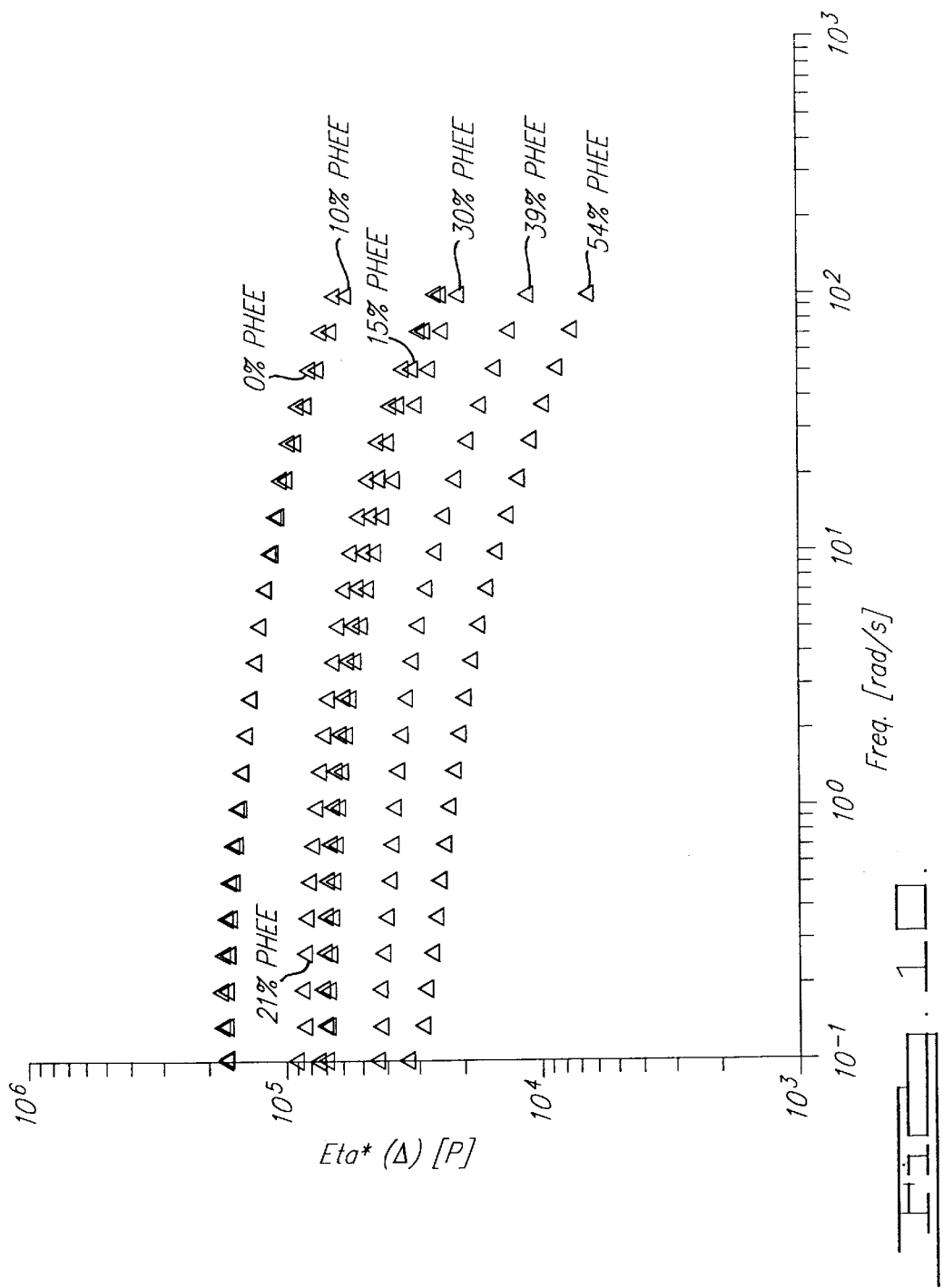
FIG. 10 is a graph of frequency sweeps versus frequency for the biodegradable polymer compositions, methods for making same, and articles therefrom, according to the present invention.

The melt viscosity properties were analyzed for Example 13. There is an interesting trend in the melt viscosity data of starch/PCL compositions with the addition of PHEE. This trend is visible in both the strain and the frequency sweeps as illustrated in FIGS. 9 and 10. The complex viscosity for the 1 wt. % PHEE, 5 wt. % PHEE, and 10 wt. % PHEE samples is essentially the same as the one containing no PHEE. In fact, the viscosity at low stains is higher at small amounts of PHEE. The viscosity then drops at 15 wt. % PHEE and remains constant until PHEE content exceeds 30 wt. %. There is another substantial drop in viscosity on going from 30 wt. % to 39 wt. %. It should be appreciated that the viscosity of PCL is six times that of PHEE at 150° C. and hence a continuous drop in viscosity with the addition of PHEE would be expected. It appears that there is a transition on changing the PHEE concentration from 10 wt. % to 15 wt. %. It is interesting that such a transition appears in the dynamic mechanical and certain tensile properties. As discussed earlier, in DMA, there is a transition from an apparent double tan delta peak to a single tan delta peak. The viscosity data supports the speculation that the reason for such a transition is the morphological change from a dispersed and absorbed PHEE to a single co-continuous one. The second transition at 39 wt. % PHEE could be phase inversion where PCL becomes the dispersed phase and PHEE fully continuous. Under these conditions, the composite viscosity would be very sensitive to the concentration of PHEE.

The present invention has been described in an illustrative manner. It is to be understood that the terminology used is intended to be in the nature of words of description rather than of limitation and the examples are intended to illustrate and not limit the scope of the present invention. Therefore, within the scope of the appended claims, the present invention may be practiced other than as specifically described.

What is claimed is:

1. A polymer composition comprising:
   a first component being a poly(hydroxy ester ether) (PHEE);
   a second component being a natural polymer; and
   a third component being either one of poly (lactic acid) (PLA) and poly(caprolactone)(PCL), wherein the first component, second component and third component are compounded to form the polymer composition.

2. A polymer composition as set forth in claim 1 wherein the natural polymer is starch.

3. A polymer composition as set forth in claim 2 wherein the starch is granular.

4. A polymer composition as set forth in claim 1 wherein the second component is present in an amount up to about 70 wt. %.

5. A polymer composition as set forth in claim 1 wherein the third component is present in an amount about equal to or greater than the first component.

6. A polymer composition as set forth in claim 1 wherein the polymer composition i s compounded at least once.

7. A polymer composition as set forth in claim 1 wherein the natural polymer has a moisture content of less than about 15 wt. %.

8. A polymer composition as set forth in claim 1 wherein the first component ranges from about 9 wt. % to about 40 wt. %, the second component ranges from about 40 wt. % to about 70 wt. % and the third component ranges from about 9 wt. % to about 40 wt. %.

9. A polymer composition as set forth in claim 1 wherein the polymer composition is biodegradable.

10. An article comprising:
    a first component being a poly(hydroxy ester ether) (PHEE);
    a second component being a natural polymer;
    a third component being either one of a poly(lactic acid) (PLA) and poly(caprolactone)(PCL), wherein the first component, second component and third component are compounded to form a polymer composition which is processed by at least one from a group comprising pelletizing, extruding, molding, casting, and stamping into the article.

11. An article as set forth in claim 10 wherein the natural polymer is starch.

12. An article as set forth in claim 11 wherein the starch is granular.

13. An article as set forth in claim 10 wherein the second component is present in an amount up to about 70 wt. %.

14. An article as set forth in claim 10 wherein the third component is present in an amount about equal to or greater than the first component.

15. An article as set forth in claim 10 wherein the first component ranges from about 9 wt. % to about 40 wt. %, the second component ranges from about 40 wt. % to about 70 wt. % and the third component ranges from about 9 wt. % to about 40 wt. %.

16. An article as set forth in claim 10 wherein the article is biodegradable.

17. An article as set forth in claim 10 wherein the natural polymer has a moisture content of less than about 15 wt. %.

18. A method of making a polymer composition, said method comprising the steps of:
    providing a first component being a poly(hydroxy ester ether)(PHEE);
    providing a second component being a natural polymer;
    providing a third component being either one of a poly (lactic acid)(PLA) and poly(caprolactone)(PCL); and
    compounding the components to form a polymer composition.

19. A method as set forth in claim 18 including the step of compounding includes pre-mixing the first component, second component, and third component together to form a mixture prior to said step of compounding.

20. A method as set forth in claim 18 including the step of forming strands of the polymer composition.

21. A method as set forth in claim 18 including the step of extruding the polymer composition.

22. A method as set forth in claim 18 including the step of pelletizing the polymer composition to form pellets.

23. A method as set forth in claim 18 wherein said step of providing comprises providing the third component in an amount about equal to or greater than the first component.

24. A method as set forth in claim 18 including the step of providing the second component in an amount up to about 70 wt. %.

25. A method as set forth in claim 18 wherein said step of mixing comprises dry blending the mixture.

26. A method as set forth in claim 18 wherein the natural polymer of the second component is starch.

27. A method as set forth in claim 18 wherein the first component ranges from about 9 wt. % to about 40 wt. %, the second component ranges from about 40 wt. % to about 70 wt. % and the third component ranges from about 9 wt. % to about 40 wt. %.

28. A method as set forth in claim 18 wherein said step of compounding comprises compounding the mixture from about 120° C. to about 180° C.

29. A method as set forth in claim 18 wherein said step of compounding comprises compounding the mixture in an extruder.

30. A method as set forth in claim 18 wherein the polymer composition is biodegradable.

* * * * *

UNITED STATES PATENT AND TRADEMARK OFFICE
CERTIFICATE OF CORRECTION

PATENT NO. : 6,632,862 B2
DATED : October 14, 2003
INVENTOR(S) : Julious L. Willett et al.

It is certified that error appears in the above-identified patent and that said Letters Patent is hereby corrected as shown below:

Column 2,
Line 42, "hydroxy-functional;" should read -- hydroxy-functional --.

Column 5,
Line 11, "Organic" should read -- organic --.
Line 19, "$R^2_1$" should read -- $R^2$ --.

Column 7,
Line 23, "represented" should read -- represented by --.
Lines 44 and 47, "$R^с$" should read -- $R^e$ --.

Column 13,
Line 49, "consited" should read -- consisted --.

Column 15,
Line 9, "previously 20" should read -- previously --.
Line 17, "re-Eed" should read -- re-fed --.
Line 61, "Length" should read -- length --.
Line 65, "Theological" should read -- rheological --.

Column 16,
Line 39, "$X_c$" should read -- $x_c$ --.
Line 56, "$-30º$ C." should read -- $\sim 30º$ --.

UNITED STATES PATENT AND TRADEMARK OFFICE
CERTIFICATE OF CORRECTION

PATENT NO.   : 6,632,862 B2
DATED        : October 14, 2003
INVENTOR(S)  : Julious L. Willett et al.

It is certified that error appears in the above-identified patent and that said Letters Patent is hereby corrected as shown below:

<u>Column 17,</u>
Line 4, "it" should read -- It --.
Line 2, "i s" should read -- is --.

Signed and Sealed this

Thirtieth Day of March, 2004

JON W. DUDAS
*Acting Director of the United States Patent and Trademark Office*